United States Patent
Aubin

(10) Patent No.: US 11,161,371 B2
(45) Date of Patent: Nov. 2, 2021

(54) AUGMENTED HIGH STRENGTH CASTER WITH DUAL OFFSET ORBITAL MOUNTING ASSEMBLY

(71) Applicant: Philip Aubin, Tracy, CA (US)

(72) Inventor: Philip Aubin, Tracy, CA (US)

( * ) Notice: Subject to any disclaimer, the term of this patent is extended or adjusted under 35 U.S.C. 154(b) by 0 days.

(21) Appl. No.: 16/534,315

(22) Filed: Aug. 7, 2019

(65) Prior Publication Data
US 2021/0094349 A1 Apr. 1, 2021

Related U.S. Application Data

(63) Continuation-in-part of application No. 15/833,366, filed on Dec. 6, 2017, now Pat. No. 10,377,176.

(60) Provisional application No. 62/432,210, filed on Dec. 9, 2016.

(51) Int. Cl.
*B60B 33/00* (2006.01)

(52) U.S. Cl.
CPC ...... *B60B 33/0076* (2013.01); *B60B 33/0028* (2013.01); *B60B 33/0049* (2013.01); *B60B 33/0068* (2013.01); *B60B 33/0042* (2013.01)

(58) Field of Classification Search
CPC .............. B60B 33/0076; B60B 33/006; B60B 33/0065; B60B 33/0005; B60B 33/0018; B60B 33/0028; B60B 33/0049; B60B 33/0068; B60B 33/0042; Y10T 16/186; Y10T 16/1857; Y10T 16/207; Y10T 16/216
See application file for complete search history.

(56) References Cited

U.S. PATENT DOCUMENTS

| | | | | |
|---|---|---|---|---|
| 438,422 A * | 10/1890 | Pederson | ............ | B60B 33/0002 16/23 |
| 743,552 A * | 11/1903 | Owens | ................ | B60B 33/0042 16/48 |
| 1,645,831 A * | 10/1927 | Tiedemann | ......... | B60B 33/0002 16/23 |
| 2,450,062 A * | 9/1948 | Voss | ........................ | B60B 33/00 16/18 CG |
| 2,688,149 A * | 9/1954 | Popp | .................... | B60B 33/0002 16/18 R |
| 2,713,179 A * | 7/1955 | Clifton | ................ | B60B 33/0042 16/47 |
| 4,254,532 A * | 3/1981 | Hager | ..................... | B60B 33/00 16/20 |
| 6,327,742 B1 * | 12/2001 | Ghouse | ............... | B60B 33/0002 16/18 R |

(Continued)

FOREIGN PATENT DOCUMENTS

JP  63170102 A  *  7/1988
JP  2013103531 A  *  5/2013

*Primary Examiner* — Chuck Y Mah

(57) ABSTRACT

In a heavy duty orbital caster assembly that includes a rotatable wheel unit joined to a transfer plate that pivots about a mounting post extending from a mounting plate adapted to be secured to the bottom surface of an object, the improvement comprising a pair of roller bearing assemblies that extend upwardly from the upper surface of the transfer plate adjacent to the caster wheel post as it extends through its bearing. The rollers impinge on the lower surface of the mounting plate, and serve to transfer some of the load of the supported object directly to the caster wheel, enabling the support of very heavy loads.

1 Claim, 9 Drawing Sheets

(56) References Cited

U.S. PATENT DOCUMENTS

| | | | |
|---|---|---|---|
| 6,604,258 B2 * | 8/2003 | Saggio | B60B 33/0018 16/42 R |
| 6,760,953 B2 * | 7/2004 | Ben-Meir | B60B 33/001 16/18 R |
| 8,387,209 B2 * | 3/2013 | Aubin | B60B 33/0015 16/31 R |
| 9,108,462 B1 * | 8/2015 | Stone | B60B 33/0023 |
| 2008/0148514 A1 * | 6/2008 | Hancock | B60B 33/0039 16/21 |

* cited by examiner

AUGMENTED HIGH STRENGTH CASTER WITH DUAL OFFSET ORBITAL MOUNTING ASSEMBLY

CROSS-REFERENCE TO RELATED APPLICATIONS

This application is a continuation-in-part of application Ser. No. 15/833,366, filed Dec. 6, 2017, now U.S. Pat. No. 10,377,176, which claims the priority filing date benefit of Provisional Application 62/432,210, filed Dec. 9, 2016.

FEDERALLY SPONSORED RESEARCH

Not applicable.

SEQUENCE LISTING, ETC ON CD

Not applicable.

BACKGROUND OF THE INVENTION

Field of the Invention

This invention relates to casters and, more particularly, to high strength caster assemblies that allow the caster to pivot easily to accommodate the direction of thrust applied to an object supported by the caster.

Description of Related Art

A problem that is common to single wheel and twin wheel casters is that the casters can become "locked up" when at least two casters supporting a wheeled object are pivoted to extend in directions that are substantially misaligned with each other. For example, if a cart with four swiveling (pivoting) casters is pushed toward a wall and abutted against the wall surface, it may then become difficult to slide the cart along the wall to reposition it, due to the fact that the casters are misaligned with respect to the plane of the wall surface. In general, when casters, either single wheel or twin wheel, are forced to pivot about a vertical axis on the contact area that they engage on a floor or carpet, their rotational movement creates a substantial frictional resistance due to the fact that the wheels are not primarily rolling but rather are "scrubbing" on the contact area. The result is that objects supported by casters may be difficult to start to roll in a desired direction if that direction does not align with the casters. And precision placement of the object may involve a great deal more maneuvering than would otherwise be necessary if the casters were capable of easily tracking the direction of thrust.

An elegant solution to this problem is found in U.S. Pat. No. 8,387,209, issued to the present inventor on Mar. 5, 2013. It describes a dual offset orbital mounting assembly that enables the caster wheel assembly to easily align itself with the direction of thrust applied to a caster-supported object, even when the casters are misaligned. This invention has met with a great deal of technical and commercial success.

Due to the ease of use of the dual offset orbital mounting assembly, industrial customers and other users have asked for this type of caster in a larger format for much larger loads, on the order of ten times the original invention. Practical experience has shown that merely scaling up the assembly to larger dimensions may lead to unexpected mechanical problems. For example, there is a lateral offset between the mounting post that is secured to the mobile object and the head post of the caster. As the load becomes very large, there is a substantial shear force on the transfer plate created by the lateral offset between the load and its supporting caster. This shear force may warp the transfer plate and cause the assembly to fail.

Clearly the prior art shows the need for an improved dual offset orbital caster assembly that can support very large loads.

BRIEF SUMMARY OF THE INVENTION

The present invention generally comprises a heavy duty orbital caster assembly that enables the caster wheel to easily align itself with the direction of thrust applied to a caster-supported object. This advantageous feature is made possible by providing a dual pivot assembly in the caster mounting that is laterally offset, whereby the caster wheels may not only pivot about a wheel pivot axis that extends through the plane of the caster wheel, but also revolve orbitally about a mounting pivot axis that is laterally offset from the wheel axis. As a result, the caster assembly easily may assume the proper orientation for any thrust applied to the caster-supported object, whereby caster "lock-up" is eliminated.

The caster assembly is comprised of a transfer plate that is provided with a pair of cylindrical openings extending side-by-side in the plate and laterally offset. A pair of bearing assemblies are provided, each secured in a respective one of the openings. Joined in and extending through one of the bearing assemblies is a mounting post that extends to a mounting plate adapted to be secured to the bottom surface of an object. The mounting plate is fixed to the object, and the transfer plate is free to rotate about the axis of the mounting tube on its respective bearing assemblies. The caster head post is supported by the other of the bearing assemblies, which enables the caster assembly to pivot about a vertical axis for steering purposes. This assembly is described in more detail in U.S. Pat. No. 8,387,209.

In order to support extremely heavy loads, the caster assembly is augmented with a pair of roller bearing assemblies that extend upwardly from the upper surface of the transfer plate adjacent to the caster wheel post as it extends through its bearing. The rollers impinge on the lower surface of the mounting plate, and serve to transfer some of the load of the supported object directly to the caster wheel. Thus shear and torque forces that would otherwise distort and warp the transfer plate are reduced, and the dual offset orbital caster assembly is capable of supporting loads more than ten times the prior art devices. This increase in load capacity is achieved without diminishing the rotational freedom of the orbital caster assembly in any significant way.

In further aspects of the invention, the rollers may be provided with guards that extend from the transfer plate and enclose a substantial portion of the rollers to prevent objects or fingers of workers from becoming entangled in the rollers.

DETAILED DESCRIPTION OF THE INVENTION

Figure 1:
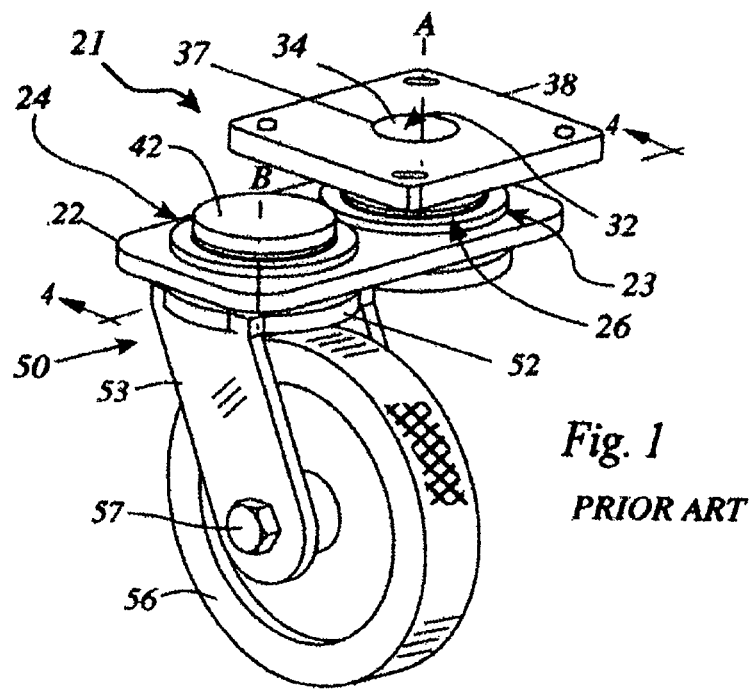
FIG. 1 is a perspective elevation of the prior art dual offset orbital caster assembly.

The present invention generally comprises an improved heavy duty caster assembly that enables the caster wheel to easily align itself with the direction of thrust applied to a caster-supported object. With regard to FIG. 1, there is shown a prior art caster assembly which forms the basis for the improvements of the present invention. As shown in FIG. 1, the prior art caster assembly 21 is composed of a transfer plate 22, which is a high strength plate (steel or the like) having two cylindrical openings 23 and 24 extending along adjacent, generally parallel axes A and B respectively. A mounting bearing assembly 26 includes mounting post 32, and the upper end 34 of the post 32 is received in an opening 37 of a mounting plate 38. It may be appreciated that the transfer plate 22 is freely rotatable about the mounting post 32 on bearings.

A head bearing assembly includes a head post 42 extending through bearings in the transfer plate. A clevis bracket 50 includes a central web portion 52 extending transversely, with a pair of arms 53 extending in parallel fashion from opposite sides of the central web 52 to support a wheel 56 on an axle 57 as is well-known in the prior art. The lower end of head post 42 is secured to the clevis bracket web 52, as by press fit, weldment, or the like.

Figure 2:
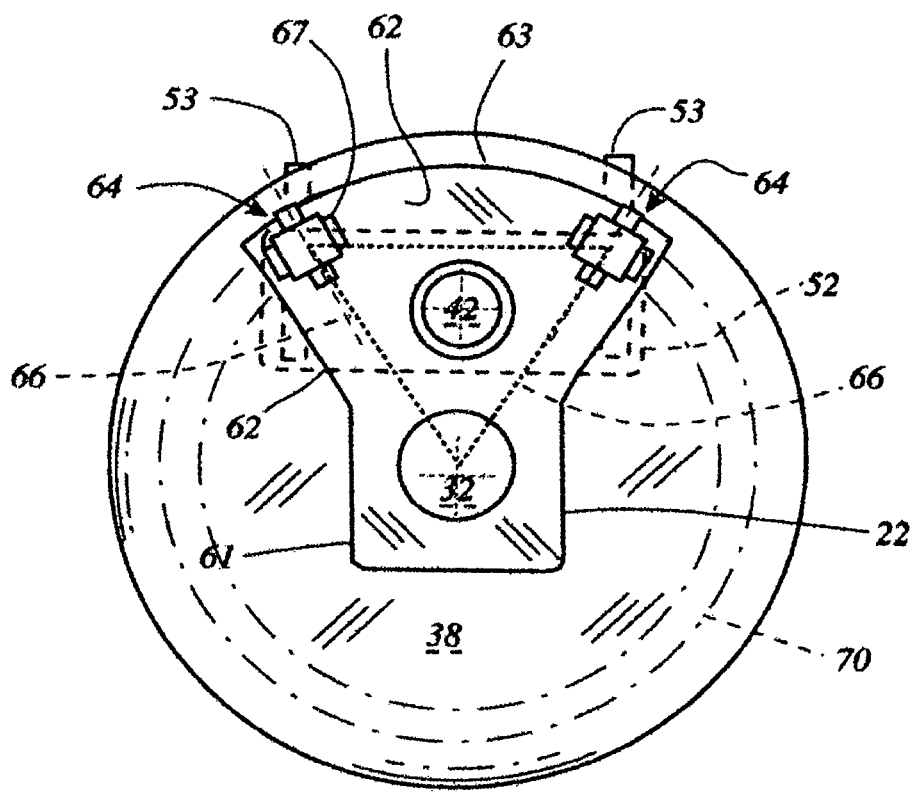
FIG. 2 is a functional plan layout of the mounting plate and transfer plate assemblies of the heavy duty dual offset orbital caster assembly of the present invention.

In the improved caster assembly (see FIGS. 2-6), the transfer plate 22 is a Y-shaped planate object that includes a rectangular portion 61 centered about the bearing shaft 32 and joined thereto. Extending from the portion 61 is a peripheral portion 62 with side edges that flare angularly outwardly as they extend radially outwardly from the shaft 32. The mounting plate 38 is formed as a generally circular disk that is coaxial with mounting post 32 and has a perimeter that is larger than the arcuate sweep of the outer edge 63 of the transfer plate. The outer edge 63 of the peripheral portion 62 is curved in general conformity to the curved edge of mounting plate 38, to which it is adjacent, as shown in FIGS. 2 and 5. As before, the head post 42 extends through bearings supported in the portion 62 of the transfer plate 22, and the clevis bracket 50 is supported by the head post 42 and depends therefrom for free rotation therewith.

Figure 3:
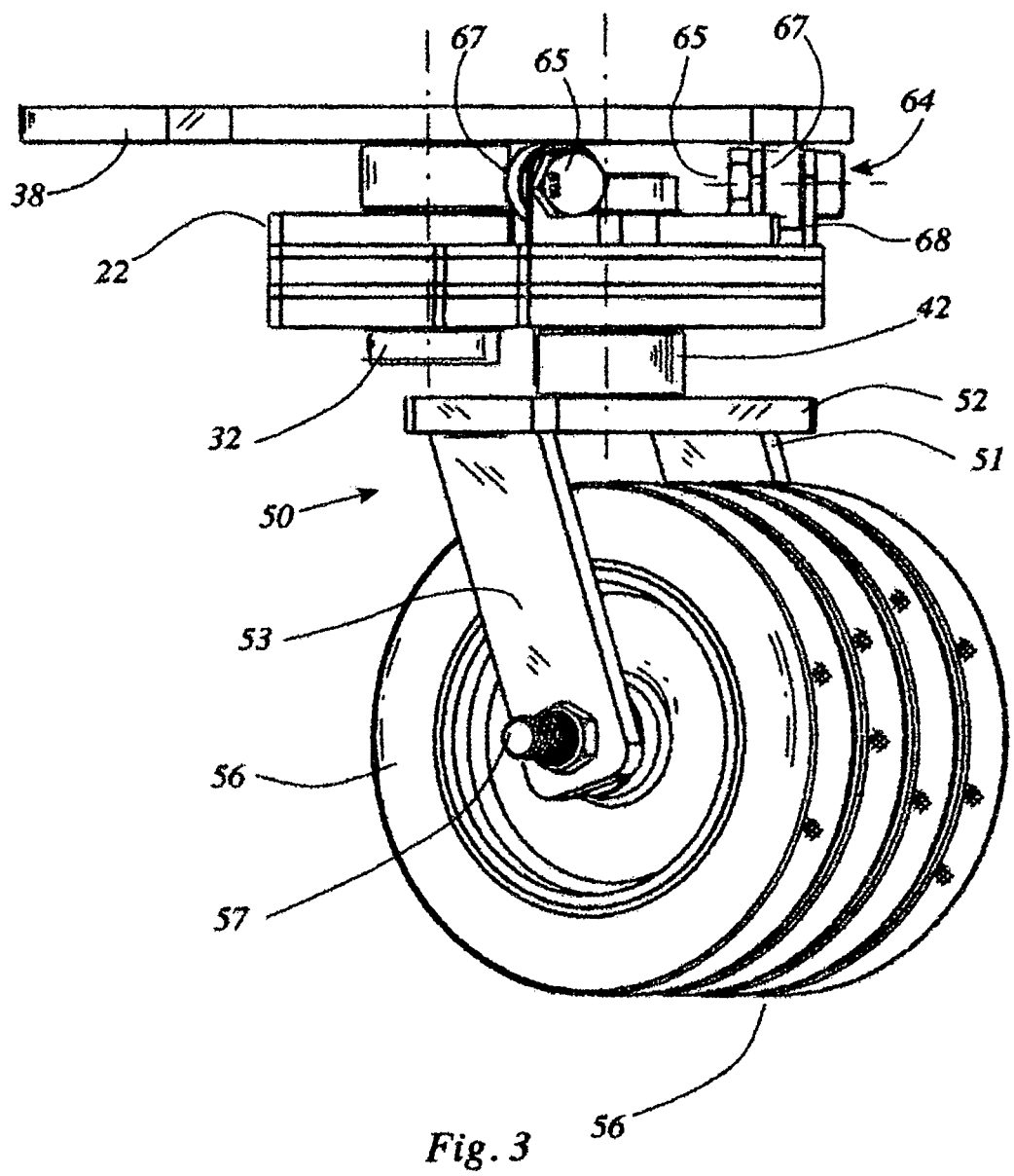
FIG. 3 is a side elevation of the heavy duty dual offset orbital caster assembly of the present invention.
Figure 4:
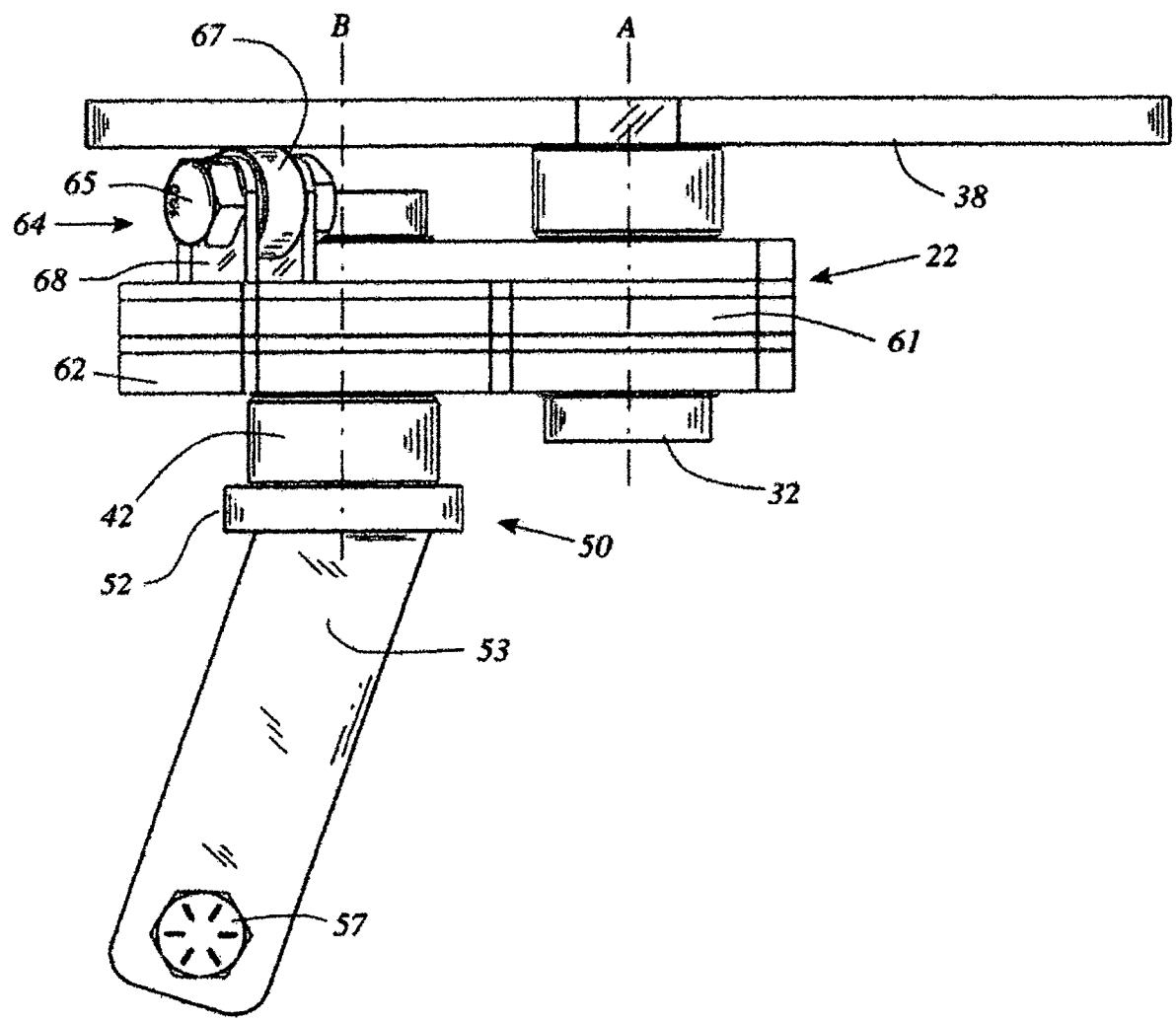
FIG. 4 is another side elevation as in FIG. 3, with the wheels removed and the transfer plate rotated to show further aspects of the heavy duty dual offset orbital caster assembly of the present invention.
Figure 5:
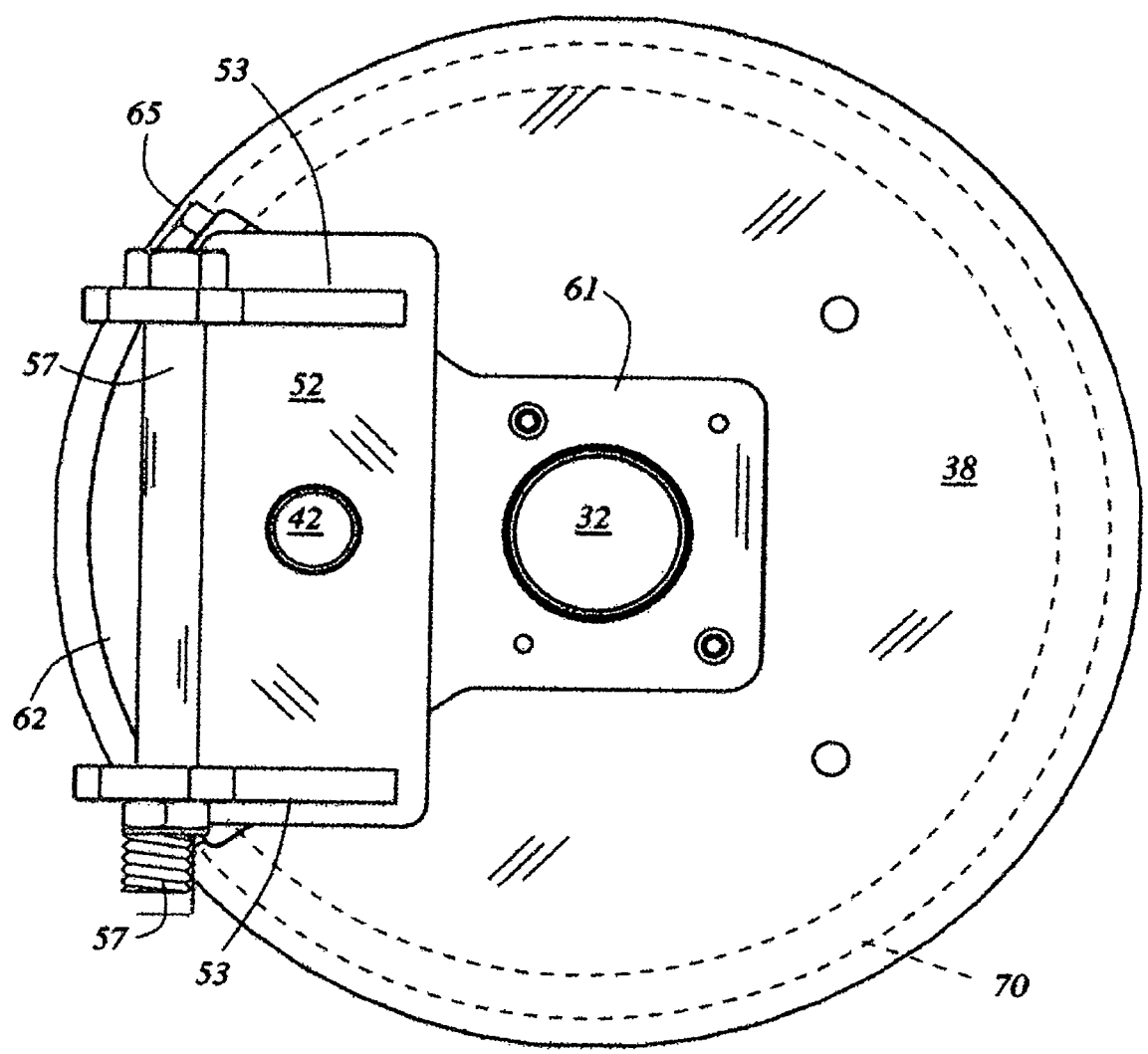
FIG. 5 is a bottom view layout of the transfer plate and mounting plate of the heavy duty dual offset orbital caster assembly of the present invention, shown with the wheels removed.
Figure 7:
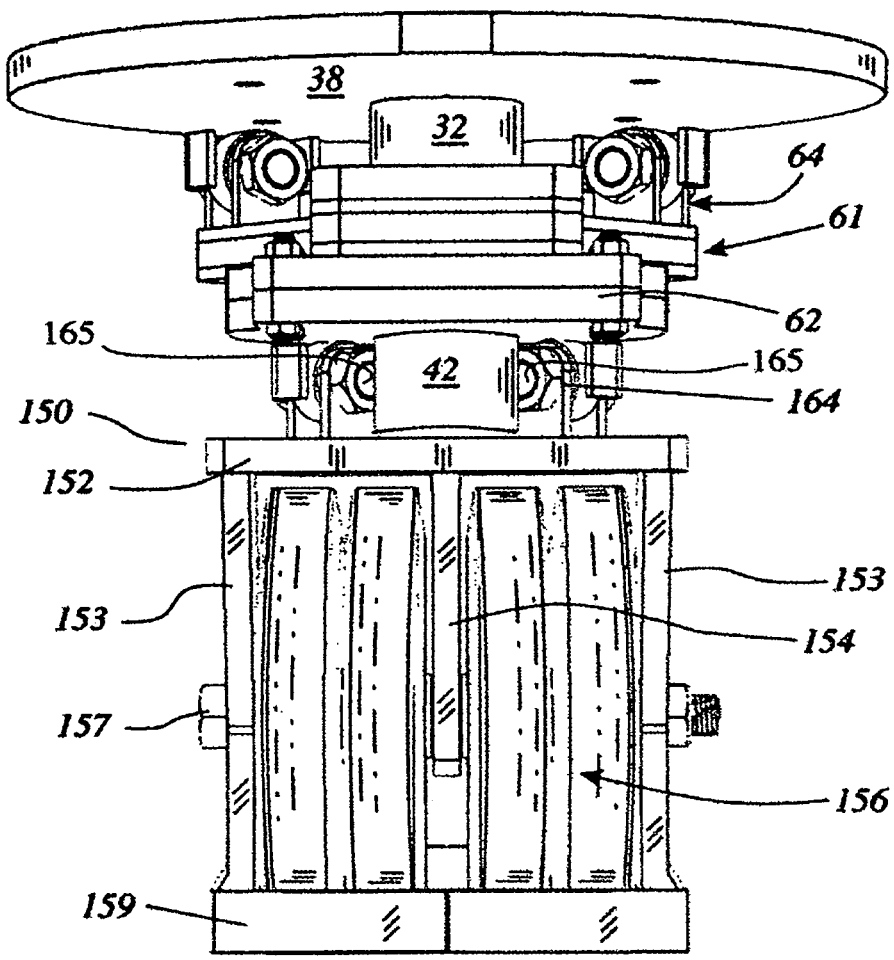
FIG. 7 is a front elevation of a further embodiment of the heavy duty dual offset orbital caster assembly of the present invention.

A salient feature of the improved caster assembly is the provision of a first plurality of roller support bearings 64 mounted on the transfer plate portion 62 adjacent to the edge 63 thereof, as shown in FIGS. 3 and 4. The roller support bearings 64 include a clevis bracket 68 extending upwardly from the transfer plate 22 and supporting the opposed ends of roller shafts 65. Rollers 67 are secured to the shafts 65 and are dimensioned so that the rollers 67 contact the mounting plate 38 in a weight-bearing relationship. Note that the roller shafts 65 have axes that extend respectively generally along radii 66 (FIG. 2) with respect to the shaft 32, with the rollers rotating freely about the shafts. Thus the roller support bearings 64 describe a circular path 70 as they roll about the surface of the mounting plate 38, and are free to travel in either rotational direction as the orbital caster is driven to rotate and revolve by propulsive forces applied to the object supported by the caster assembly.

The roller support bearings 64 are provided to share some of the load applied by the object supported by the caster assembly; that is, the weight load is transmitted to the transfer plate 22 and the wheels 56 by not only the shaft 32, but also the rollers 67, forming a support triangle defined by radii 66 and a line joining the two roller bearings, as shown in broken lines in FIG. 2. Note that the shaft 42 is located within the outer boundary of the support triangle, at approximately the centroid of the triangle. Locating the shaft 42 within the support triangle creates a stable distribution of forces to the rollers 67 and shaft 32, and bending moment applied to the shaft 32 and the transfer plate 22 itself is greatly reduced, if not neutralized. Thus very heavy loads (up to many thousands of pounds) may be supported by the assembly without jeopardizing the free orbital motion of the apparatus.

Figure 6:
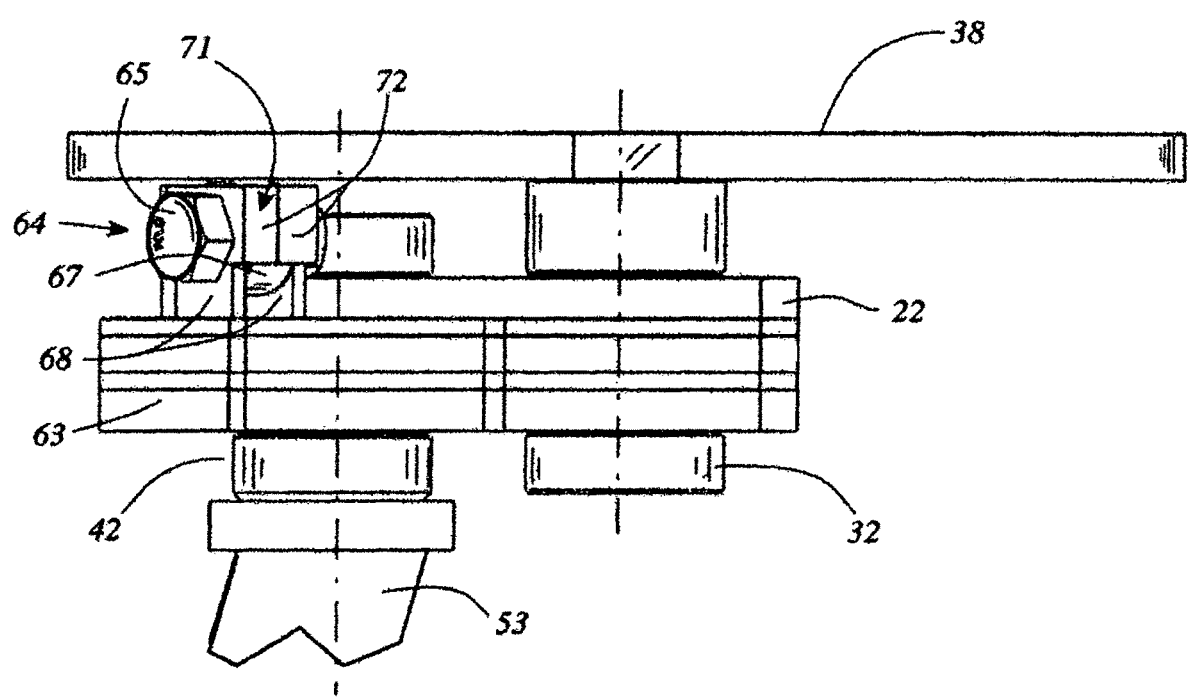
FIG. 6 is a partial side elevation of a further embodiment of the heavy duty dual offset orbital caster assembly of the present invention.

With regard to FIG. 6, a further embodiment of the invention includes a roller protector assemblies 71 disposed to protect the rollers 67 from contamination by particulates and liquids, as well as entanglements with fibrous materials such as hair, plastic trim debris, and the like. Most importantly, the protector assemblies 71 prevent the fingers or hair or clothing of users and workers from becoming entangled in the rollers. Each roller protector assembly includes at least one, or a pair of panels 72, each extending between and spanning the legs of bracket 68 directly adjacent to the roller 67. The distal edge of each panel 72 is located closely proximate to the adjacent surface of mounting plate 38 thereby blocking most objects from becoming entrained between the roller 67 and the bottom surface of the mounting plate 38.

Although a pair of roller bearing assemblies 64 are shown and described herein, it is clear that the invention may employ one or more or several roller roller bearing assemblies 64, as required by the magnitude of the expected load and the capacity of each roller bearing assembly, in accordance with good engineering practices. Likewise, the number of wheels 56 that are provided in the caster assembly may be more or less than the four wheels shown in the drawings.

Returning to FIG. 5, it is apparent that the axis of the shaft 42 that supports the clevis bracket 50 is offset laterally from the axis of the shaft 57 that supports the wheels 56. This offset, which is due to the lead angle of the clevis arms 53, may cause a bending moment in the clevis arms 53 and a torsional distortion of the clevis bracket web 52. This could lead to failure of the shaft assembly 42 under extreme overloading conditions, such as static overload testing that is mandated for some certifications.

With regard to FIGS. 7-10, a further embodiment of the invention comprises a superstrong caster structure that is capable of withstanding extreme overloading. All of the components that have correspondence with the previous embodiments are accorded the corresponding reference numerals. The clevis bracket 50 is replaced by clevis bracket 150. The clevis bracket 150 includes a central web portion 152 extending transversely, with a pair of outer arms 153 extending in parallel fashion from opposite sides of the central web 152 In addition, a medial arm 154 extends from the web 152 parallel to the arms 153 and spaced therebetween to support a wheel truck 156 on an axle 157 as is well-known in the prior art. The lower end of head post 42 is secured to the clevis bracket web 152, as by press fit, weldment, or the like. Each arm 153 includes a dogleg portion 158 extending distally below the mounting of the axle 157 to support a bumper 159 that circumscribes the lower portion of wheel truck 156 and is spaced apart from the floor surface that supports the wheel truck 156. The bumper protects the wheels from objects and debris on the supporting surface that may otherwise interfere with the wheels rolling and turning thereon.

Figure 8:
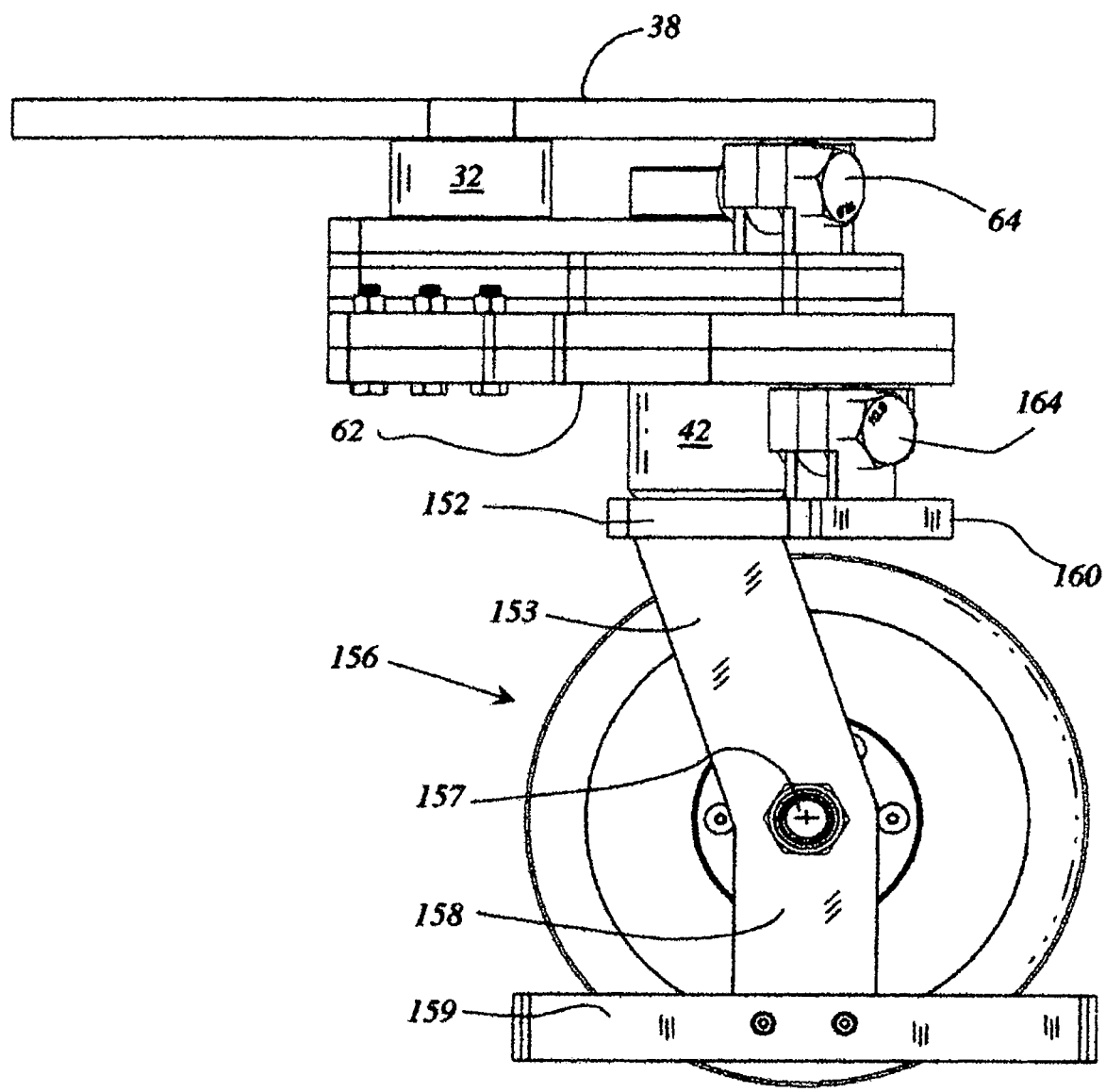
FIG. 8 is a side elevation of the further embodiment shown in FIG. 7.
Figure 9:
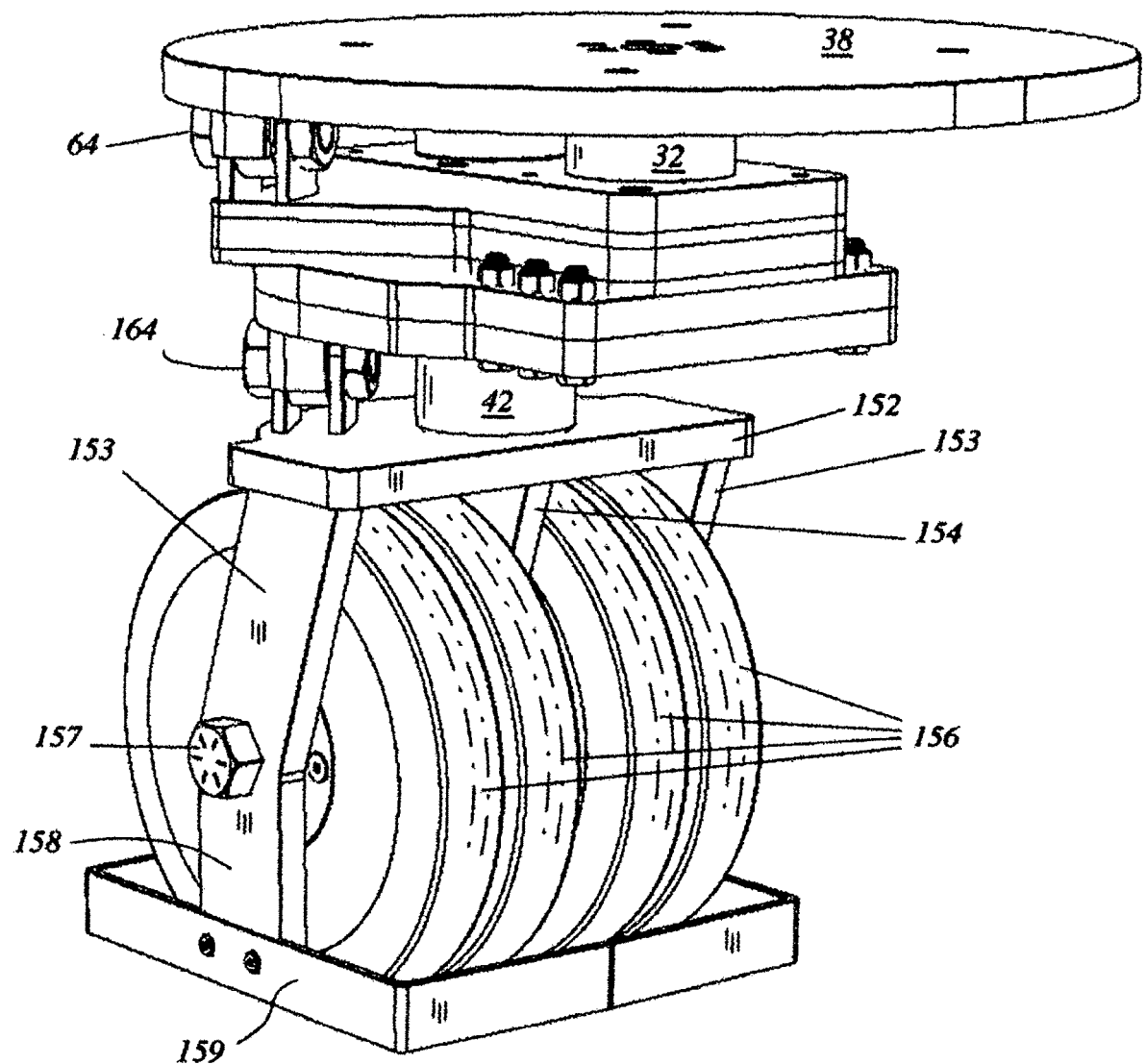
FIG. 9 is a perspective view of the embodiment shown in FIGS. 7 and 8.
Figure 10:
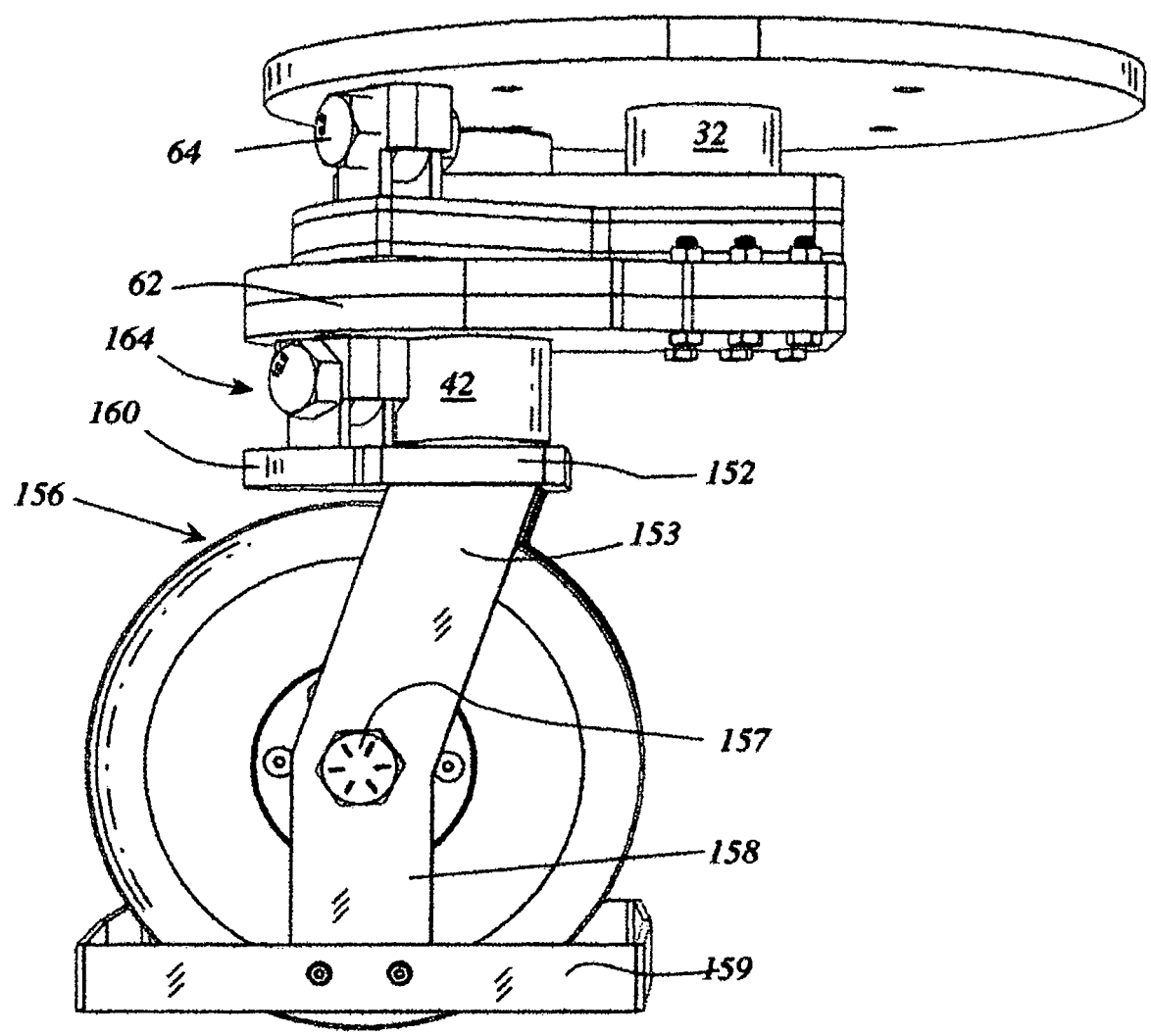
FIG. 10 is a perspective side view of the embodiment of FIGS. 7-9.

The central web portion 152 is provided with an extension 160 extending in the same plane and projecting outwardly in the same general direction as the lead angle of the support arms 153 and 154, as evident in particular in FIGS. 8 and 10. A second plurality of roller support bearings 164 are mounted on the central web extension 160 adjacent to the periphery thereof, as shown in FIGS. 8-10. The roller support bearings 164 are constructed substantially similar to the roller support bearings described previously, and are arranged to impinge on the lower surface of plate 62 that supports the upper end of shaft 42. Note that the roller shafts 165 have axes that extend generally along respective radii of the shaft 42, with the rollers rotating freely about the shafts. Thus the roller support bearings 164 describe a circular path as they roll about the bottom surface of the plate 62, and are free to travel in either rotational direction as the orbital caster is driven to rotate and revolve by propulsive forces applied to the object supported by the caster assembly.

The roller support bearings 164 are provided to share some of the load applied by the object supported by the caster assembly to the lower portion of the caster assembly. In particular, they address the fact that the axis of the shaft 42 that supports the clevis bracket 150 is offset laterally from the axis of the shaft 157 that supports the wheels 156. and the load is not centered on the shaft 157. As shown best in FIG. 8, the roller support bearings 164 define a triangle with respect to the shaft 42, with vertical loading taking place at each vertex of the triangle. The combined effect of the load vectors at the vertices is a vertical load vector that approximately intersects the shaft 157, and this relationship is generally constant at any angular disposition of the wheel truck 156 about the axis of the shaft 42. Thus the bending moment applied to the central web 152 itself and the support arms 153 and 154 is greatly reduced, if not neutralized.

The roller support bearings 164 may be provided as shown with the roller protector structures 71, as described in the previous embodiment, but their inclusion is not required to carry out the load centering function described above. Likewise, they are shown as a paired assembly, but this engineering expedient is but one possible mechanical embodiment of the invention.

The foregoing description of the preferred embodiments of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be de fined by the claims appended hereto.

The invention claimed is:

1. In a heavy duty orbital caster assembly that includes a rotatable wheel unit disposed in ground-engaging fashion and joined by a head post to a transfer plate that pivots about a mounting post extending from a mounting plate adapted to be secured to the bottom surface of an object, the improvement comprising:

said rotatable wheel unit including a central web portion, and a plurality of arms rigidly depending from said central web portion in parallel, spaced apart fashion, an axle extending through distal portions of said arms and supported fixedly thereby, and a plurality of ground-engaging wheels supported on said axle, said distal portions of said arms including dogleg portions to establish a lead angle for said ground-engaging wheels;

at least one first roller bearing assembly secured between said mounting plate and said transfer plate in a load transferring relationship and disposed to extend upwardly from the upper surface of the transfer plate to contact said mounting plate in rolling fashion;

at least one pair of second roller bearing assemblies secured to said rotatable wheel unit and disposed to extend upwardly therefrom to contact said transfer plate in a load transferring relationship;

said head post and said pair of second roller bearing assemblies comprising the vertices of a support triangle, and the load vectors at said vertices combine to form a vertical load vector that approximately intersects said axle and said ground-engaging wheels.

* * * * *